C. L. GREEN.
Hand-Seeder.
No 51,825.
Patented Jan. 2, 1866.
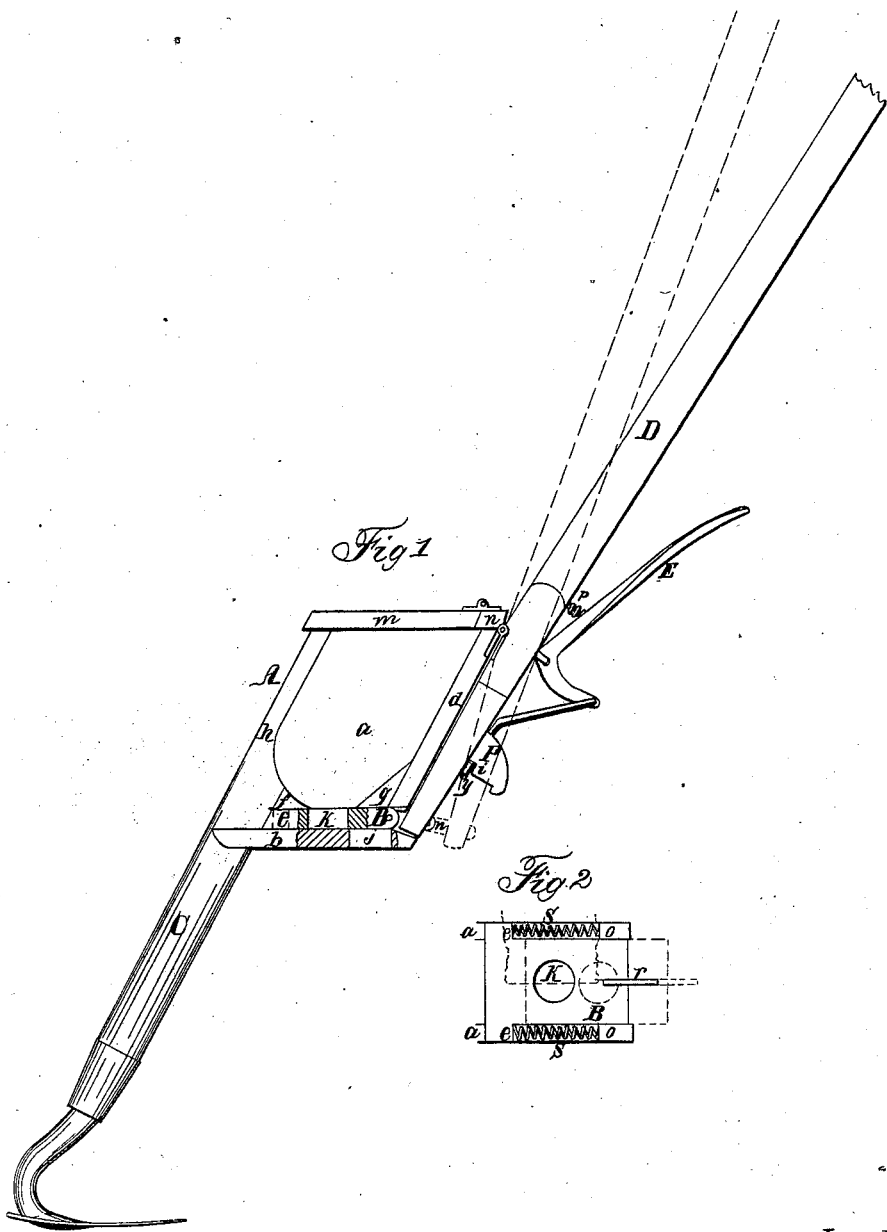

UNITED STATES PATENT OFFICE.

CALVIN L. GREEN, OF JOHNSON'S CREEK, NEW YORK.

IMPROVEMENT IN HAND CORN-PLANTERS.

Specification forming part of Letters Patent No. 51,825, dated January 2, 1866

*To all whom it may concern:*

Be it known that I, CALVIN L. GREEN, of Johnson's Creek, in the county of Niagara and State of New York, have invented a new and useful Hand Corn-Planter; and I do hereby declare that [the following is a full, clear, and exact description thereof, reference being had to the accompanying drawings, making part of this specification, in which—

Figure 1 is a side elevation of my invention, one side of the grain-case A being removed to show the arrangement of the parts. Fig. 2 is an inverted view of the delivery-slide B, and showing the adjusting-springs $s$.

Similar letters of reference indicate corresponding parts in both figures.

This invention consists in the employment of a jointed handle in hoes for hand-planters, and providing the same with a seed box or case having an automatic delivery-slide, the whole being manipulated while preparing the hill and covering the seed.

To enable others to make and use my invention, I will describe its construction and operation.

I use the ordinary hoe H, but the handle is composed of two sections, C and D, the former being made with a flat head, $h$, so as to form the front of the grain-case A. The fixed bottom $b$ and the flat sides $a$ of the case A are attached to the head $h$. The lid $m$ may be hinged to the cross-bar $n$, and while in use may be hooked down in front. The upper section, D, of the handle is hinged to the back $d$ of the case, as seen in Fig. 1, the lower end being coupled to the slide B by a link, $r$. Said slide is kept in its present position by the springs $s$, Fig. 2, resting against its shoulders $e$, and those $o$ of the side boards, $a$. The notched clasp P is fixed to the back $d$, and passes through the handle D. The adjustable clamp E is pivoted to section D of the handle, and it is kept in its present adjustment by the spring $p$. The angle-blocks $f$ and $g$ conduct the corn to the cell $k$ of the slide.

The case A may be made of any desired size, to hold one quart, more or less, and when it is filled the operator brushes down a spot in the soft mold where he wishes to make a hill. This he does as he moves the hoe forward, and placing it in the ground to gather the earth to cover the hill with, he bears down upon the handle with the hand nearest the case A, while holding the other in a fixed position. This causes the springs $s$ to yield, and the slide B is drawn out until the cell $k$ registers to the opening $j$ in the bottom $b$, and the corn is deposited therefrom into the hill. Then as the earth is lifted to cover the corn the slide is drawn back and receives the charge for the next hill.

If the ground should be hard, or from any other cause the operator failed to get earth enough the first stroke to cover the hill properly, he clasps the locking-clamp E and closes it against the handle D. The link at $y$ is drawn into the notch $i$ and thus temporarily constituting a rigid handle, whereby he may make as many strokes as desired without depositing any more seed.

If it is desired to increase or decrease the quantity of seed or the number of kernels per hill, it may be done by changing the slide B for one having a larger or a smaller cell $k$.

What I claim as my invention, and desire to secure by Letters Patent, is—

1. The employment or use of the jointed handle C and D in hand corn-planters, in combination with the delivery-slide B.
2. The adjustable locking-clamp E, constructed, arranged, and operating substantially in the manner and for the purpose shown and described.
3. The combination of the seed-box A with the jointed hoe-handle in hand-planters, for the purposes set forth.

C. L. GREEN.

Witnesses:
WM. S. LOUGHBOROUGH,
S. M. NEWTON.